United States Patent
Jarus et al.

(10) Patent No.: US 7,763,675 B2
(45) Date of Patent: Jul. 27, 2010

(54) NUCLEATED POLYPROPYLENE NANOCOMPOSITES

(75) Inventors: David A. Jarus, Avon Lake, OH (US); Guoqiang Qian, Arlington Heights, IL (US)

(73) Assignees: Polyone Corporation, Avon Lake, OH (US); AMCOL International Corporation, Arlington Heights, IL (US)

( * ) Notice: Subject to any disclaimer, the term of this patent is extended or adjusted under 35 U.S.C. 154(b) by 0 days.

(21) Appl. No.: 12/294,406

(22) PCT Filed: Mar. 5, 2007

(86) PCT No.: PCT/US2007/063261
§ 371 (c)(1), (2), (4) Date: Sep. 24, 2008

(87) PCT Pub. No.: WO2007/117789
PCT Pub. Date: Oct. 18, 2007

(65) Prior Publication Data
US 2009/0117393 A1 May 7, 2009

Related U.S. Application Data

(60) Provisional application No. 60/744,174, filed on Apr. 3, 2006.

(51) Int. Cl.
C08K 3/34 (2006.01)
C08K 9/04 (2006.01)
C09C 1/42 (2006.01)
C08F 110/06 (2006.01)
C08F 10/14 (2006.01)
C08F 110/14 (2006.01)
C08F 210/14 (2006.01)
C08F 210/00 (2006.01)
C08F 36/00 (2006.01)
C08F 136/00 (2006.01)
C08F 236/00 (2006.01)
C04B 33/00 (2006.01)

(52) U.S. Cl. .................... 524/445; 526/351; 526/348.2; 526/348; 526/335; 526/339; 524/447; 501/148

(58) Field of Classification Search .......... 524/445–451
See application file for complete search history.

(56) References Cited

U.S. PATENT DOCUMENTS

| | | | |
|---|---|---|---|
| 6,462,122 B1 * | 10/2002 | Qian et al. .................. | 524/445 |
| 6,767,953 B2 * | 7/2004 | Ohkawa et al. ............. | 524/451 |
| 6,770,697 B2 | 8/2004 | Drewniak et al. | |
| 6,864,308 B2 | 3/2005 | Rosenthal et al. | |
| 7,173,099 B1 * | 2/2007 | Minami ..................... | 526/351 |
| 2002/0156171 A1 | 10/2002 | Drewniak et al. | |
| 2005/0272858 A1 * | 12/2005 | Pierini et al. ................ | 524/543 |
| 2007/0142534 A1 | 6/2007 | Moad et al. | |

FOREIGN PATENT DOCUMENTS

KR 20050101718 A 10/2005
WO WO-01/25300 * 4/2001

OTHER PUBLICATIONS

Zhang, X., Xie, F., Pen, Z., Zhang, Y., Zhang, Y., Zhou, W. European Polymer Journal, vol. 38, p. 1-6, 2002.*
Total Petrochemicals USA, Inc., "Polypropylene 3925WZ" Product Literature (2005).

* cited by examiner

Primary Examiner—Vasu Jagannathan
Assistant Examiner—Anthony H Sheh
(74) Attorney, Agent, or Firm—John H. Hornickel

(57) ABSTRACT nuc-PP nanocomposite is made from the mixing of nuc-PP with olefin elastomer and organoclay, and optionally, a dispersion agent. Unexpectedly, processing properties such as higher melt flow, and performance properties such as higher toughness and higher stiffness, are obtained when compared with commercially available PP nanocomposite.

15 Claims, 2 Drawing Sheets

NUCLEATED POLYPROPYLENE NANOCOMPOSITES

CLAIM OF PRIORITY

This application claims priority from U.S. Provisional Patent Application Ser. No. 60/744,174 bearing and filed on Apr. 3, 2006, which is incorporated by reference.

FIELD OF THE INVENTION

This invention concerns composites of high flexural modulus nucleated polypropylene ("nuc-PP") which contain concentrations of dispersed organoclay.

BACKGROUND OF THE INVENTION

The mixture of organoclays and polyolefins, commonly called nano-olefins, is highly desired because the organoclays can contribute stiffness and toughness properties to polyolefins for extruded or molded articles. Polyolefins for molded or extruded articles have been useful since the mid-$20^{th}$ Century. Organoclays, smectite inorganic clays intercalated with organic ions, such as quaternary ammonium, have become useful in the last decade.

Organoclays are expensive additives for polyolefins such as polypropylene (PP). Nonetheless, several others have taught the use of organoclays as additives for PP, among other resins. Representative examples of such prior work include U.S. Pat. No. 6,462,122 (Qian et al.) and PCT Published Patent Application WO 2005/056644 (Jarus et al.). All of these prior efforts provide organoclay in a generalized listing of PP compounds.

SUMMARY OF THE INVENTION

Quite unexpectedly, it has been found the type of PP in which organoclay is dispersed provides an unexpectedly superior thermoplastic polyolefin (TPO) compound for both processing properties and performance properties.

TPO compounds need to have a balance of three properties, preferably with an intensity of each of them: melt flow values, impact toughness values, and tensile stiffness values. Preferably, TPO compounds should also have superior heat distortion temperature (HDT) and coefficient of linear thermal expansion (CLTE) properties.

Currently, such TPO nanocomposites as Nanoblend™ LST 5571 compound from PolyOne Corporation has acceptable melt flow, toughness, and stiffness. But there is a need to improve those properties such that a TPO compound can become an effective substitute for polycarbonate, acrylonitrile-butadiene-styrene (ABS), and blends of them, and other highly engineered polymeric compounds that have a higher cost for manufacture and use.

Unexpectedly, it has been found that a particular type of PP provides superior values to that of conventional PP used to make TPO nanocomposites. This particular type of PP is a high flexural modulus nucleated polypropylene. For purposes of this invention, "nucleated polypropylene" or "nuc-PP" means polypropylene resins which have a nucleating agent included in the polypropylene resin and wherein the nucleated resin has a flexural modulus of at least about 200,000 psi.

Unfortunately, a nuc-PP is difficult to work with, in that it does not exhibit toughness, as measured by Room Temperature Notched Izod testing according to ASTM Test No. D256 ("Notched Izod"). Typical values for toughness for nuc-PP are less than 0.5, whereas Notched Izod values for conventional PP used in commercially available nanocomposites are in the range of 0.5-0.8. Therefore, while nuc-PP has excellent stiffness, it has as miniscule a toughness of conventional PP.

Making a TPO from nuc-PP also involves the addition of an olefin elastomer to serve as an impact modifier. But the toughness of an impact modified nuc-PP, as seen by comparative examples fails to yield the necessary toughness for a well-engineered thermoplastic polyolefin having the balance of toughness, stiffness, and melt flow identified above.

The present invention solves these balance difficulties to find a highly tough, highly stiff, easy flowing TPO unexpected from the properties of the starting resin, together with the combination of both olefin elastomer and organoclay. Indeed, the starting resin with either olefin elastomer or organoclay, but not both, yields an unsatisfactory toughness. But together, the organoclay and the olefin elastomer perform with superiority.

Thus, one aspect of this invention is a method of improving toughness in nuc-PP, comprising mixing organoclay and olefin elastomer into a high flexural modulus nucleated polypropylene to form a nano-nuc-PP compound.

Another aspect of the present invention is the nano-nuc-PP compound.

Another aspect of the present invention is the article made from the nano-nuc-PP compound.

Another aspect of the present invention is a film made from the nano-nuc-PP compound.

Features and advantages of the invention will be explained below while discussing the embodiments.

EMBODIMENTS OF THE INVENTION nuc-PP

Nucleated polypropylene is a thermoplastic resin known throughout the world as useful in the manufacturing of food containers and packaging, houseware containers, medical devices such as syringes, automobile parts, and other items which benefit from a thermoplastic compound having high crystallinity, high stiffness, and high heat deflection temperature.

Figure 1:
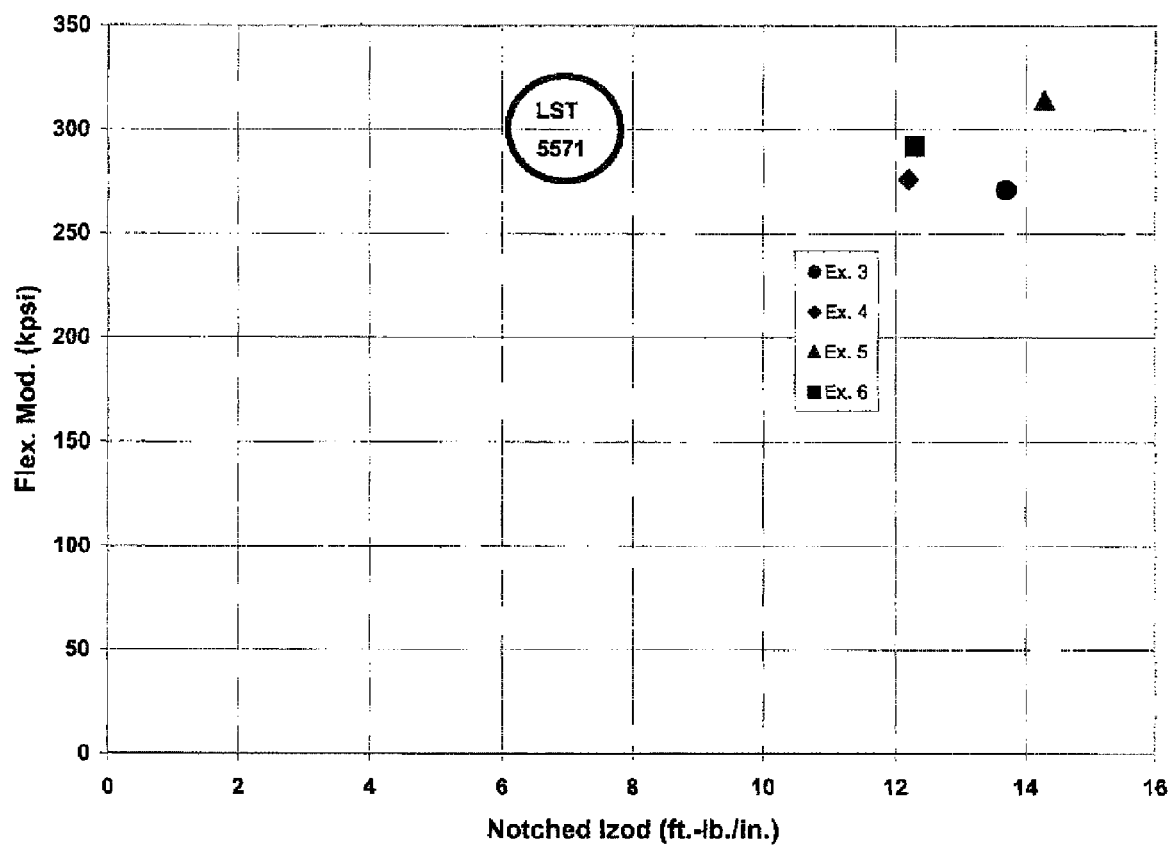
FIG. 1 is a graph of stiffness (Flexural Modulus) vs. toughness (Notched Izod) for four embodiments of the present invention.

In a conventional stiffness vs. toughness graph for engineered plastics, such as that seen in FIG. 1, engineered plastic compounds which occupy a region in the upper right are greatly desired but difficult to achieve. Starting with a nuc-PP that has much flexural modulus as possible is preferred, before the additives to the compound contribute their properties. For that reason, use of a nuc-PP that has a flexural modulus of at least about 200,000 psi (1378 MPa), and preferably about 300,000 psi (2068 MPa), maximizes the possibility of excellent stiffness and toughness for the compounds of the present invention.

Optionally, a nuc-PP that has a tensile strength at yield of at least about 5,000 psi (34 MPa) and preferably at least about 6,000 psi (41 MPa) enhances performance properties of the compound.

Also optionally, a nuc-PP that has a melt flow index (g/10 min. @ 230° C.) greater than about 20 is more preferred than a nuc-PP having a melt flow index of less than 20 for mold processing efficiency.

Any nuc-PP commercially available and meeting the above flexural modulus property threshold is suitable for use in the present invention. Non-limiting examples of commercially available nuc-PP include Innovene brand nuc-PP resin (formerly Accpro brand resin) from Innovene (formerly BP Chemicals), nuc-PP resins from ExxonMobil, Inspire brand nuc-PP resins from Dow Chemicals, Sunoco nuc-PP resins from Sunoco, Co. More particularly, within the Innovene brand product range, the following grades are suitable with the last one mentioned being preferred: H05H-00, H07D-01, H12Z-02, H12Z-00, H20H-00, H20Z-00, H28E-00, H35Z-00, H53J-00, and H35Z-02.

Organoclays

Organoclay is obtained from inorganic clay from the smectite family. Smectites have a unique morphology, featuring one dimension in the nanometer range. Montmorillonite clay is the most common member of the smectite clay family. The montmorillonite clay particle is often called a platelet, meaning a sheet-like structure where the dimensions in two directions far exceed the particle's thickness.

Inorganic clay becomes commercially significant if intercalated with an organic intercalant to become an organoclay. An intercalate is a clay-chemical complex wherein the clay gallery spacing has increased, due to the process of surface modification by an intercalant. Under the proper conditions of temperature and shear, an intercalate is capable of exfoliating in a resin matrix, such as nuc-PP or other polyolefins. An intercalant is an organic or semi-organic chemical capable of entering the montmorillonite clay gallery and bonding to the surface. Exfoliation describes a dispersion of an organoclay (surface treated inorganic clay) in a plastic matrix. In this invention, organoclay is exfoliated at least to some extent.

In exfoliated form, organoclay platelets have a flexible sheet-type structure which is remarkable for its very small size, especially the thickness of the sheet. The length and breadth of the particles range from 1.5 µm down to a few tenths of a micrometer. However, the thickness is astoundingly small, measuring only about a nanometer (a billionth of a meter). These dimensions result in extremely high average aspect ratios (200-500). Moreover, the miniscule size and thickness mean that a single gram contains over a million individual particles.

Nanocomposites are the combination of the organoclay and the plastic matrix. In polymer compounding, a nanocomposite is a very convenient means of delivery of the organoclay into the ultimate compound, provided that the plastic matrix is compatible with the principal polymer resin components of the compounds. In such manner, nanocomposites are available in concentrates, masterbatches, and compounds from Nanocor, Inc. of Arlington Heights, Ill. (www.nanocor.com) and PolyOne Corporation of Avon flake, Ohio (www.polyone.com) in a variety of nanocomposites. Particularly preferred organoclays are I24TL, I30P, and I44P from Nanocor, Inc. PolyOne markets PP nanoconcentrates, such as Nanoblend™ MB1001 brand concentrate.

Nanocomposites offer flame-retardancy properties because such nanocomposite formulations burn at a noticeably reduced burning rate and a hard char forms on the surface. They also exhibit minimum dripping and fire sparkling.

Olefin Elastomer

Polyolefin elastomers or rubber in the present invention are used to modify impact resistance of the compound. Any suitable polyolefin elastomer can be used. For example, polybutadiene rubber, ethylene-propylene-diene rubber (EPDM), ethylene-octene copolymers, and other elastomers are useful. Non-limiting examples of such elastomers are those commercially available from multinational companies such as Bayer, Dupont-Dow Elastomers, Uniroyal Chemical, ExxonMobil, and others. ENGAGE™ 8180, ENGAGE™ 8842, and other ENGAGE™ polyolefin elastomers are especially preferred ethylene-octene copolymers available from DuPont Elastomers of Wilmington, Del. that function well as impact modifiers for nanocomposites of the invention.

Nanocomposite Properties nuc-PP nanocomposites achieve stiffness ranging from about 250,000 psi (1723 MPa) to about 400,000 psi (2758 MPa), and preferably from about 270,000 psi to about 400,000 psi. The broader range of stiffness contributes to a high impact resistance important for molded or extruded articles useful as auto parts, industrial products, appliances, hand tools, etc.

nuc-PP nanocomposites achieve toughness ranging from about 5 to about 15 ft.-lb./in. (2.669 Joules/cm-8 Joules/cm), and preferably from about 8 to about 15. The broader range of toughness contributes to a high tensile strength important for molded or extruded articles useful as those items listed in the paragraph above.

nuc-PP nanocomposites achieve melt flow ranging from about 2 to about 10 g/10 min. @230° C. The broader range of melt flow contributes to efficiency (energy consumption and time) during molding or extruding of the articles identified above.

As mentioned previously, an excellent TPO has a balance of these three properties with each of them having a high value. Ideally, in a three-cornered graph, the optimal TPO would have a location equidistant from the three axes. If a fourth dimension of intensity is added, such as the sum of the three properties, the point of that three dimensional graph would be well above the baseline of the three properties.

Moreover, excellent TPOs have two additional quantitative properties and one qualitative properties met by the nano-nuc-PP compounds of the present invention: coefficient of linear thermal expansion (CLTE), heat deflection temperature (HDT), and overall appearance. Again, a balance of these three properties would place the optimal TPO at a point equidistant from the three axes.

In the nano-nuc-PP compounds of the present invention, the compounds can have a CLTE of less than about 0.00005 inch/inch/° C. and a HDT of at least about 80° C. Overall, the compounds of the present invention have been found to have good appearance.

Optional Additives

The nuc-PP nanocomposite of the present invention can include conventional plastics additives in an amount that is sufficient to obtain a desired processing or performance property for the ultimate thermoplastic compound, but in a manner that does not disrupt the desired stiffness, toughness, and melt flow performance properties.

The amount should not be wasteful of the additive nor detrimental to the processing or performance of the compound. Those skilled in the art of thermoplastics compounding, without undue experimentation but with reference to such treatises as Plastics Additives Database (2004) from Plastics Design Library (www.williamandrew.com), can select from many different types of additives for inclusion into the nuc-PP nanocomposites of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Of these optional additives, as shown in the Examples below, a dispersant such as Maxsperse brand dispersion agent is preferred to be added to the nano-nuc-PP TPO of the present invention in an amount ranging from about 0.1 to about 5, and preferably from about 0.25 to about 3 weight percent.

Optional Polymers

While the nuc-PP nanocomposite can be made without other polymers present, it is optional to introduce other polymers into the extruder for a variety of ultimate compound properties and performances, but in a manner that does not disrupt the stiffness, toughness, and melt flow performance property of the nuc-PP nanocomposite. These materials can be blended, co-extruded, or otherwise laminated with the nuc-PP for composite structures. Other resins include those selected from the group consisting of polyolefins, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

Table 1 shows ranges of acceptable, desirable, and preferred weight percents of the various ingredients for addition to the extruder, relative to the total weight of the nuc-PP nanocomposite emerging from the extruder, all being expressed as approximate values. Because the additives and other polymers are optional, the low end of each range is zero.

TABLE 1

Weight Percent of Ingredients

| Ingredients | Acceptable (Wt. %) | Desirable (Wt. %) | Preferred (Wt. %) |
|---|---|---|---|
| nuc-PP resin | 10-74 | 20-72 | 25-70 |
| Organoclay | 8-15 | 9-14 | 10-12 |
| Olefin elastomer | 18-35 | 19-32 | 20-30 |
| Optional Additives | 0-70 | 0-50 | 0-30 |
| Optional Polymers | 0-90 | 0-65 | 0-50 |

Extruder Processing

The preparation of compounds of the present invention is uncomplicated. The compound of the present can be made in batch or continuous operations. The compound can start from a concentrate of organoclay in a thermoplastic (also called a masterbatch) or original ingredients.

Mixing occurs in an extruder that is elevated to a temperature that is sufficient to melt the nuc-PP, any optional concentrate thermoplastic matrix in a concentrate, and any optional other polymers and to adequate disperse the organoclay and optional additives therewithin.

Extruders have a variety of screw configurations, including but not limited to single and double, and within double, co-rotating and counter-rotating. Extruders also include kneaders and continuous mixers, both of which use screw configurations suitable for mixing by those skilled in the art without undue experimentation. In the present invention, it is preferred for chain extension to use a twin co-rotating screw in an extruder commercially available from Coperion Werner-Pfleiderer GmbH of Stuttgart, Germany.

Extruders have a variety of heating zones and other processing parameters that interact with the elements of the screw(s). Extruders can have temperatures and other conditions according to acceptable, desirable, and preferable ranges as shown in Table 2.

TABLE 2

Processing Conditions

| Condition | Acceptable | Desirable | Preferred |
|---|---|---|---|
| Zones 1-5 Temp. | 170° C.-230° C. | 180° C.-220° C. | 190° C. |
| Zones 6-7 Temp. | 180° C.-240° C. | 180° C.-230° C. | 200° C. |
| Zones 8-9 Temp. | 190° C.-240° C. | 190° C.-230° C. | 200° C. |
| Die Temp. | 190° C.-240° C. | 190° C.-230° C. | 200° C. |
| Screw Rotation | 300-1100 rpm | 400-1000 rpm | 600 rpm |
| Feeder Rate | 50-95% of available drive torque | 75-95% of available drive torque | 90-95% of available drive torque |

Location of ingredient addition into the extruder can be varied according the desired duration of dwell time in the extruder for the particular ingredient. Table 3 shows acceptable, desirable, and preferable zones when ingredients are to be added in the process of the present invention.

TABLE 3

Ingredient Addition Points

| Ingredient | Acceptable Zone(s) |
|---|---|
| nuc-PP | Throat |
| Organoclay | Throat |
| Olefin Elastomer | Throat or Downstream or Both |
| Optional Additives | Throat |
| Optional Polymers | Throat or Downstream or Both |

Extruder speeds can range from about 50 to about 1200 revolutions per minute (rpm), and preferably from about 300 to about 600 rpm.

Typically, the output from the extruder is pelletized for later extrusion or molding into polymeric articles.

Subsequent Processing

The nuc-PP nanocomposite made according to the present invention can serve either as a concentrate or as a compound. If the former, then the nuc-PP nanocomposite is an intermediate product, an ingredient to be added with other ingredients to subsequent compounding steps in a batch or continuous mixing apparatus. The dilution or "let-down" of the concentrate into the compound can result in an organoclay concentration in the compound ranging from about 4 to less than 15 weight percent, and preferably from about 6 to about 12 weight percent, to maximize stiffness and toughness performance properties with minimal concentration of organoclay in the nuc-PP nanocomposite.

Ultimately, the compound is formed into an article or film using a subsequent extrusion or molding techniques. These techniques are well known to those skilled in the art of thermoplastics polymer engineering. Without undue experimentation but using references such as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using nuc-PP nanocomposites of the present invention.

USEFULNESS OF THE INVENTION nuc-PP nanocomposites of the present invention are useful for making complex curved molded articles, simple curved extruded articles, and the like. Any of the articles of the present invention can be made to have a particular color by use of color concentrates from PolyOne Corporation. Thus, conventional PP articles can have the addition of stiffness, toughness, and melt flow previously unavailable in polyolefin nanocomposites without loss of other structural, functional, or cosmetic properties important in the marketing of polyolefin products to the general consuming public.

Further embodiments of the invention are described in the following Examples.

EXAMPLES

Table 4 shows concentrate formulations A-D.

TABLE 4

Concentrate Formulations (Wt. Percent)

| | A | B | C | D |
|---|---|---|---|---|
| Profax 6323 PP (Basell) | | 19 | | |
| Innovene H35Z-02 nuc-PP (Innovene)* | 30 | | 19 | 18 |
| I44P clay (Nanocor) | 40 | 40 | 40 | 40 |
| PB5104 maleated PP (Chemtura) | 30 | 40 | 40 | 40 |
| Maxsperse dispersion agent (Chemax) | | | | 1 |
| B-225 stabilizer (Ciba Chemicals) | | 1 | 1 | 1 |

*Recently changed brand names: Previously called Acepro 9934 resin

Table 5 shows the dilution or "let-down" of Concentrate A to into various combinations of nuc-PP, and two different types of polyolefin elastomer.

TABLE 5

Compound Formulations (Wt. Percent)

| | Comp A | Comp B | Comp C | Comp D | Comp E | Comp F | 1 | 2 |
|---|---|---|---|---|---|---|---|---|
| Conc. A | 0 | 10 | 0 | 10 | 10 | 0 | 30 | 30 |
| Innovene H35Z-02 nuc-PP (Innovene) | 100 | 72.5 | 82.5 | 90 | 72.5 | 82.5 | 50 | 50 |
| EG-8150 Elastomer (DuPont Elastomers) | 0 | 17.5 | 17.5 | 0 | 0 | 0 | 0 | 0 |
| EG-8180 Elastomer (DuPont Elastomers) | 0 | 0 | 0 | 0 | 17.5 | 17.5 | 20 | 20 |

All concentrates A-D were made on a 27 mm Leistritz co-rotating twin screw extruder made by American Leistritz Extruder Corp. of Somerville, N.J., USA. All ingredients were added at the throat. The feeder rate was 15 pound per hour. The temperatures were set at 165° C. for Zone 1, 170° C. for Zones 2-8, and 175° C. for the die.

All six compounds Comp. A-F and 1-2 were made on the same extruder under the same conditions. All ingredients were added at the throat.

Using a 33 Cincinnati Millacron molding machine, the following settings were used to mold plaques and tensile test bars of the compounds. Table 6 shows the molding conditions

TABLE 6

| Molding Conditions | |
|---|---|
| Drying Conditions: | |
| Temperature | 100° C. |
| Time | 3 |
| Temperatures: | |
| Nozzle (° F.) | 430° |
| Zone 1 (° F.) | 435° |
| Zone 2 (° F.) | 415° |
| Zone 3 (° F.) | 400° |
| Mold (° F.) | 205° |
| Oil Temp (° C.) | 94.6° |
| Speeds: | |
| Screw RPM | 100 |
| Pressures: | |
| Hold Stg 1 (PSI) | 600 |
| Hold Stg 2 (PSI) | 500 |
| Timers: | |
| Injection Hold (sec) | 6 |
| Cooling Time (sec) | 20 |
| Operation Settings: | |
| Shot Size | 2.5 |
| Cushion | 0.33 |

TABLE 6-continued

| Molding Conditions | |
|---|---|
| Cut-Off Position | 0.8 |
| Cut-Off (XFER) Pressure | N/A |
| Cut-Off Time | 10 |
| Cut-Off Mode | Pos. |
| Decompression | 0.2 |

Table 7 shows the test results of Flexural Modulus (stiffness) (ASTM D790), Notched Izod (toughness) (ASTM D256), and HDT (ASTM D648) using the molded samples.

TABLE 7

Stiffness, Toughness, and HDT of Comparative Examples A-F and Examples 1-2

| | Comp A | Comp B | Comp C | Comp D | Comp E | Comp F | 1 | 2 |
|---|---|---|---|---|---|---|---|---|
| Flex. Modulus (kpsi) | 235.1 | 183.1 | 173.6 | 255.5 | 191.3 | 173.3 | 208.2 | 208.1 |
| Notched Izod (ft-lb/in) | 0.22 | 0.97 | 0.74 | 0.26 | 1.14 | 0.68 | 5.6 | 8 |
| HDT (° C.) | 137 | 116 | 123 | 132 | 114 | 119 | 103 | 103 |

Table 7 shows the dramatic difference in Notched Izod when both the impact modifier and the concentrate are added in about 20-30 weight percent: Notched Izod that was no better than neat nuc-PP for any of the comparison combinations more than quadrupled in value. The average of Examples 1 and 2 (Notched Izod=6.8) compares favorable with commercially available Nanoblend™ LST 5571 (Notched Izod=7) made and sold by PolyOne Corporation, in which the resin is conventional PP. See also FIG. 1.

Examples 1 and 2 show that the combination of the presence of 12 weight percent of organoclay and 20 weight percent of impact modifier in the final compound provides a balance of stiffness and toughness not otherwise attainable in nuc-PP alone, or with 4 weight percent organoclay, or with 17.5 weight percent, or even with 4 weight percent organoclay and 17.5 weight percent. It is unexpected that a threshold is crossed with a tripling of organoclay content, though the impact modifier content remained relatively constant (17.5 weight percent—20 weight percent).

With this breakthrough that a particularly difficult type of polypropylene could yield such striking stiffness and toughness results with at least an organoclay content of about 10 weight percent in the compound, another set of examples established more preferred formulations, including those which added a dispersion agent to the compound (in addition to the maleated polypropylene in the concentrate).

Table 8 shows the dilution or "let-down" of concentrate formulations B-D and other ingredients for use in making Comparison Examples G-H and Examples 3-6. In each of the six examples, the concentration of intercalated clay was 10 weight percent of the total compound. The only difference between Comparison Examples G-H and Examples 3-4 was the choice of PP resin. The only difference between Examples 3-4 and Examples 5-6 was the replacement of 0.25 weight percent of Innovene nuc-PP with Maxsperse dispersion agent.

TABLE 8

Compound Formulations (Wt. Percent)

| | Comp. G | Comp. H | 3 | 4 | 5 | 6 |
|---|---|---|---|---|---|---|
| Conc. B | 25 | 25 | | | | |
| Conc. C | | | 25 | 25 | | |
| Conc. D | | | | | 25 | 25 |
| Profax 6323 PP (Basell) | 45 | 50 | | | | |
| Innovene H35Z-02 nuc-PP (Innovene) | | | 45 | 50 | 45 | 50 |
| EG-8180 Elastomer (DuPont Elastomers) | 30 | 25 | 30 | 25 | 30 | 25 |

All compounds were made on the same Leistritz extruder under the same conditions as for Comparative Examples A-F and Examples 1-2. All ingredients were added at the throat.

All samples were molded as done for Comparative Examples A-F and Examples 1-2.

Table 9 shows physical properties of the test plaques. A total of 5 plaques were tested. The average results along with standard deviation are shown.

TABLE 9

Physical Properties

| | Comp. G | Comp. H | 3 | 4 | 5 | 6 |
|---|---|---|---|---|---|---|
| ROOM TEMP. NOTCHED IZOD (ft.-lb./in) | 15.1 | 13.6 | 13.7 | 12.2 | 14.3 | 12.3 |
| STD. DEV. | 0.2 | 0.4 | 0.6 | 0.1 | 0.3 | 0.3 |
| FLEXURAL MODULUS (kpsi) | 251 | 255 | 271 | 276 | 314 | 292 |

TABLE 9-continued

Physical Properties

| | Comp. G | Comp. H | 3 | 4 | 5 | 6 |
|---|---|---|---|---|---|---|
| STD. DEV. | 1.6 | 6.7 | 6.9 | 0.6 | 1.3 | 1.2 |
| HDT 66 PSI DEFLECTION TEMP (° F.) | 69.8 | 77.1 | 79.8 | 89.7 | 80.3 | 84.1 |
| COEFF. THERMAL LINEAR EXPANSION C.p.D. | 0.000047 | 0.000047 | 0.000049 | 0.000047 | 0.000049 | 0.000048 |
| STD. DEV. | 0 | 0.000002 | 0.000001 | 0.000002 | 0.000001 | 0.000002 |

Unexpectedly, all of Comparative Examples G-H and Examples 3-6 had superior Notched Izod toughness values. Moreover, Examples 3-6 differed from Comparative Examples C-H in that the Examples 3-6 had superior Flexural Modulus stiffness values.

Because the values of toughness (Notched Izod), stiffness (Flexural Modulus), HDT and melt flow are more significant for compounding and shaping thermoplastic polyolefins (TPOs) than other of the physical properties reported in Table 9, these four values were extracted from Table 9 and placed into Table 10 with the values adjusted within the decimal system range of 0-50 to provide an indexed result. Table 10 also shows the relative increase and decrease of Examples 1 and 3 to Comparative Example A and of Examples 2 and 4 to Comparative Example B and Examples 1 and 3.

The only difference between Comparative Example C and Example 3 and between Comparative Example H and Example 5 is the choice of resin. Example 4 adds a dispersion agent, as does Example 6. Table 10 shows that all of melt flow, stiffness, and HIT values of the Examples 3-6 are superior to the values of Comparative Examples G-H, allowing better processing properties (melt flow) and better performance properties (HDT and stiffness) than previously thought possible by those skilled in the art.

properties thus far achieved in internal testing of conventional impact modified PP, such as that marketed as Nanoblend™ LST 5571 by PolyOne Corporation. It is not presently known why or how the physical properties for Comparative Examples G and H were achieved. For purposes of this invention, such formulations are considered Comparative Examples but should not be regarded as prior art. In the event that continued experimentation permits elucidation of the conditions under which conventional PP can achieve such stiffness and toughness in a commercial scale environment, additional patents may be sought.

Even when considering the unexpected nature of Comparative Examples G and H, Examples 3-6 are truly superior TPOs useful in the plastics industry. Table 1 seen as FIG. 1 demonstrates the scope of the advance, when comparing to commercially available Nanoblend™ LST 5571 nanocomposite compound.

Figure 2:
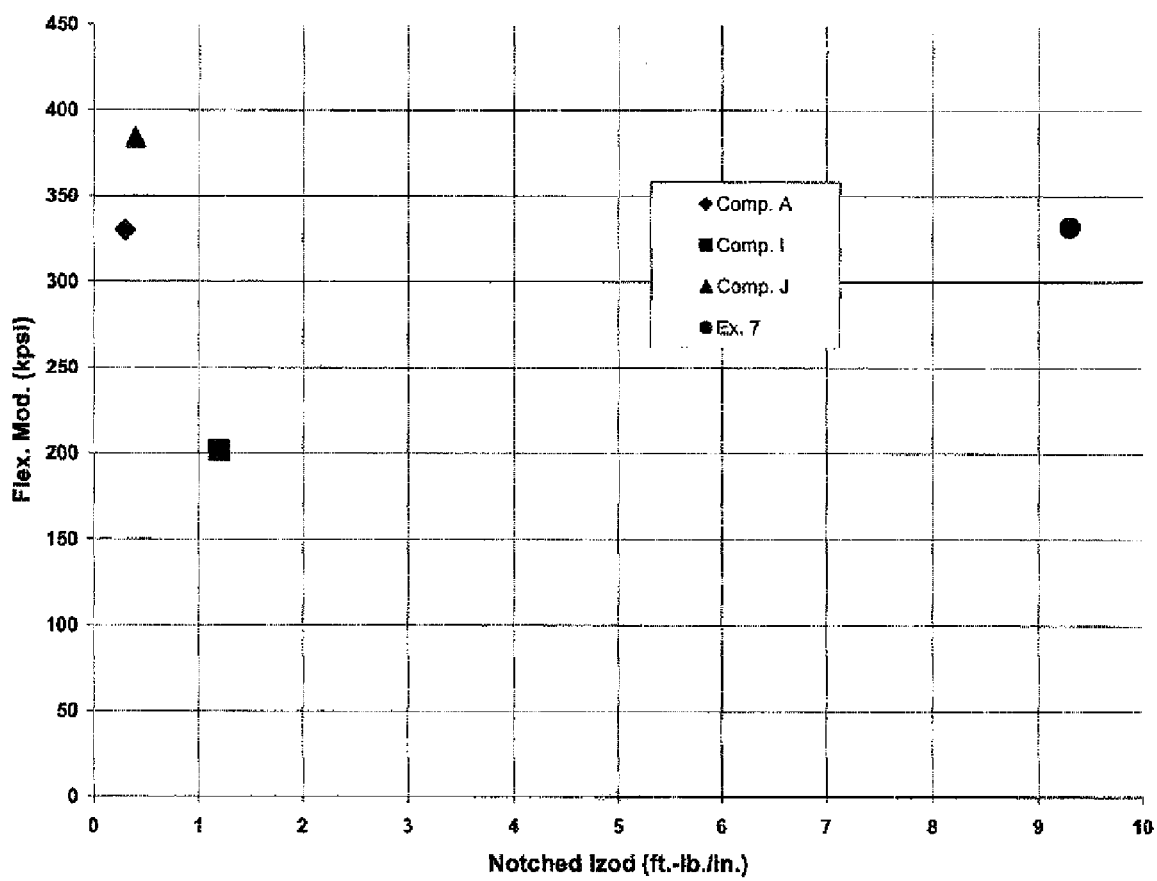
FIG. 2 is a graph of stiffness (Flexural Modulus) vs. toughness (Notched Izod) for another embodiment of the present invention.

Table 11 offers another explanation of the unexpected results of the present invention. Comparative Examples I and J and Example 7, along with Comparative Example A from above, show variation of two different parameters in a 2×2 matrix of performance property comparisons. FIG. 2 shows the results graphically.

TABLE 10

Percentage Improvement

| Patent Example | Toughness | Stiffness (kpsi) | Melt Flow | HDT |
|---|---|---|---|---|
| Comp. G | 15.1 | 251 | 21.8 | 69.8 |
| 3 | 13.7 | 271 | 38.5 | 77.1 |
| % Increase to Comp. A | (9.3)% | 8.0% | 76.6% | 10.5% |
| 5 | 14.3 | 314 | 35.5 | 79.8 |
| % Increase to Comp. A | (5.3)% | 25.1% | 62.8% | 14.3% |
| % Increase to Ex. 3 | 4.4% | 15.9% | (7.8)% | 3.5% |
| Comp. H | 13.6 | 255 | 21.8 | 89.7 |
| 4 | 12.2 | 276 | 46.6 | 80.3 |
| % Increase to Comp. A | (10.3)% | 8.2% | 113.8% | (10.5)% |
| 6 | 123 | 292 | 40.2 | 84.1 |
| % Increase to Comp. A | (9.6)% | 14.5% | 84.4% | (6.2)% |
| % Increase to Ex. 4 | 0.8% | 5.8% | (13.7)% | 4.7% |

Use of superior melt flow, superior stiffness, superior toughness TPO compound has been achieved with excellent HDT. Depending on the circumstances, use of as little as 0.25 weight percent of a dispersion agent can improve the toughness as much as by 5% and the stiffness by as much as 15.9%, though the melt flow declines slightly.

It should be noted that Comparative Examples G and H represent the most superior stiffness and toughness physical

TABLE 11

Elastomer vs. Organoclay vs. Both

| | Conc. A | Innovene H35Z-02 nuc-PP | EG-8180 Elastomer | Flex. Modulus (kpsi) | Notched Izod Impact (ft.-lb./in.) |
|---|---|---|---|---|---|
| Comp A | 0 | 100 | 0 | 330 | 0.3 |
| Comp I | 0 | 80 | 20 | 202 | 1.2 |
| Comp J | 30 | 70 | 0 | 384 | 0.4 |
| 7 | 30 | 50 | 20 | 332 | 9.3 |

Unmodified nuc-PP (Comp. A) has excellent stiffness but miniscule toughness. nuc-PP modified with elastomer to make a TPO (Comp. I) has reduced stiffness and little toughness improvement. nuc-PP modified with organoclay (Comp. J) has superior stiffness but miniscule toughness. Therefore, neither elastomer alone nor organoclay alone as additives to nuc-PP result in an acceptable engineered thermoplastic compound with both good stiffness and good toughness. Unexpectedly, the combination of both organoclay and elastomer in nuc-PP results in excellent stiffness and superior toughness.

FIG. 2 shows how dramatic the combination of organoclay and elastomer as additives improve nuc-PP. Combined with Examples 3-6 seen in FIG. 1, for the first time, engineered plastic compounds have superior stiffness and toughness based on a polyolefin resin.

The invention is not limited to the above embodiments. The claims follow.

What is claimed is:

1. A method of using nuc-PP with organoclay to improve toughness of nuc-PP, comprising mixing organoclay and olefin elastomer into a high flexural modulus nucleated polypropylene to form a nano-nuc-PP compound, wherein the amount of olefin elastomer ranges from 18 and 35 weight percent of the compound, wherein the high flexural modulus nucleated polypropylene is polypropylene resin which has a nucleating agent included in the polypropylene resin and wherein the nucleated polypropylene has a flexural modulus of at least about 1378 MPa, wherein the nano-nuc-PP compound has a stiffness ranging from about 1723 MPa to 2758 MPa, wherein the nano-nuc-PP compound has a toughness ranging from about 8 ft.-lb./in. to about 15 ft.-lb./in., and wherein the nano-nuc-PP compound has a melt flow ranging from about 2 to about 10 g/10 min. @ 230° C.

2. The method of claim 1 wherein the organoclay is a smectite clay intercalated with an organic intercalant.

3. The method of claim 1, wherein the organoclay is a montmorillonite clay intercalated with an organic intercalant.

4. The method of claim 1, wherein the high flexural modulus nucleated polypropylene has a tensile strength of at least about 34 MPa.

5. The method of claim 1, wherein the olefin elastomer is selected from the group consisting of polybutadiene rubber, ethylene-propylene-diene rubber (EPDM), ethylene-octene copolymers, and combinations thereof.

6. A nano-nuc-PP compound, comprising:
(a) high flexural modulus nucleated polypropylene;
(b) at least about 8 weight percent organoclay; and
(c) at least from about 8 to about 35 weight percent olefin elastomer,
wherein the high flexural modulus nucleated polypropylene is polypropylene resin which has a nucleating agent included in the polypropylene resin and wherein the nucleated polypropylene has a flexural modulus of at least about 1378 MPa,
wherein the nano-nuc-PP compound has a stiffness ranging from about 1723 MPa to 2758 MPa, wherein the nano-nuc-PP compound has a toughness ranging from about 8 ft.-lb./in. to about 15 ft.-lb./in., and wherein the nano-nuc-PP compound has a melt flow ranging from about 2 to about 10 g/10 min. @ 230° C.

7. The compound of claim 6, further comprising:
(d) a dispersion agent.

8. The compound of claim 6, wherein the compound is made by mixing organoclay and olefin elastomer into a high flexural modulus nucleated polypropylene to form the nano-nuc-PP compound.

9. The compound of claim 8, wherein the organoclay is a montmorillonite clay intercalated with an organic intercalant.

10. The compound of claim 8, wherein the high flexural modulus nucleated polypropylene has a tensile strength of at least about 34 MPa.

11. The compound of claim 8, wherein the olefin elastomer is selected from the group consisting of polybutadiene rubber, ethylene-propylene-diene rubber (EPDM), ethylene-octene copolymers, and combinations thereof.

12. An article made from the nano-nuc-PP compound of claim 8.

13. The article of claim 12, wherein the article is extruded.

14. The article of claim 12, wherein the article is molded.

15. The article of claim 12 in the form of a film.

* * * * *